Jan. 23, 1968 A. R. CUNNINGHAM 3,364,667
HAY TEDDER

Filed Dec. 4, 1964 4 Sheets-Sheet 1

INVENTOR
ARTHUR RAYMOND CUNNINGHAM
BY Whittemore
Hulbert & Belknap
ATTORNEYS

INVENTOR
ARTHUR RAYMOND CUNNINGHAM
ATTORNEYS

Jan. 23, 1968   A. R. CUNNINGHAM   3,364,667
HAY TEDDER
Filed Dec. 4, 1964   4 Sheets-Sheet 3
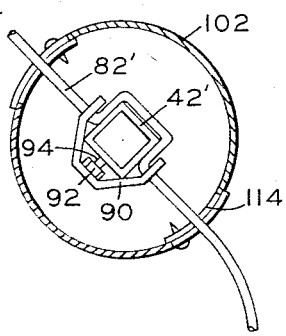
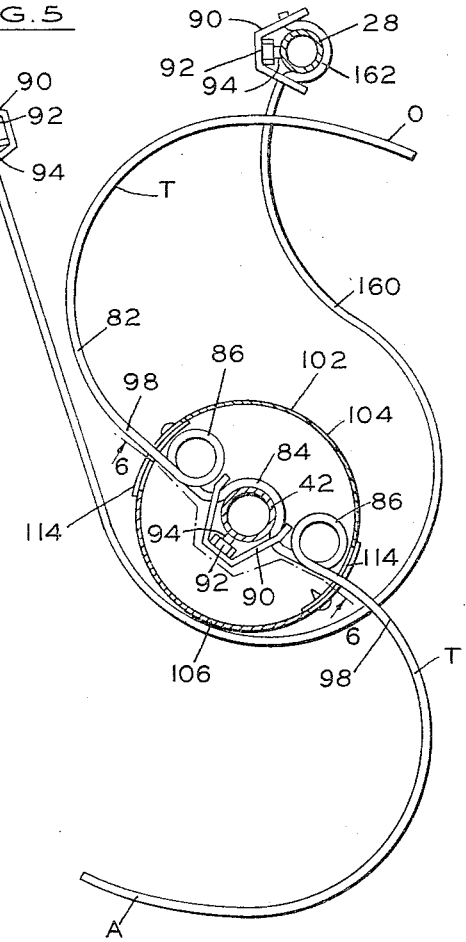
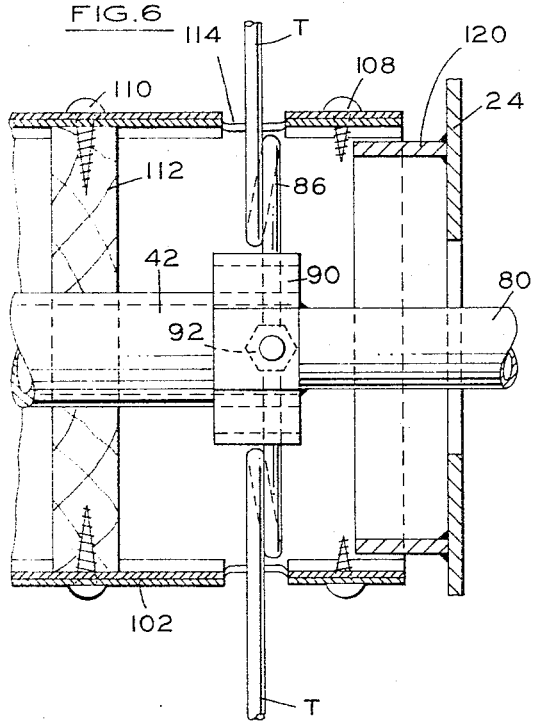
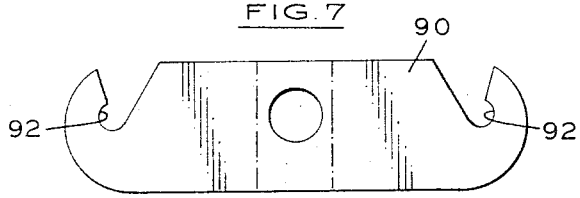
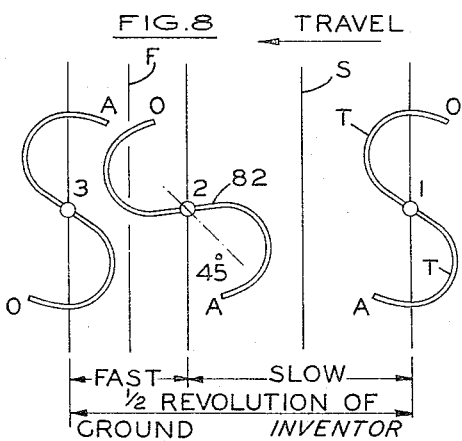
INVENTOR
ARTHUR RAYMOND CUNNINGHAM
BY Whittemore
Hulbert & Belknap
ATTORNEYS

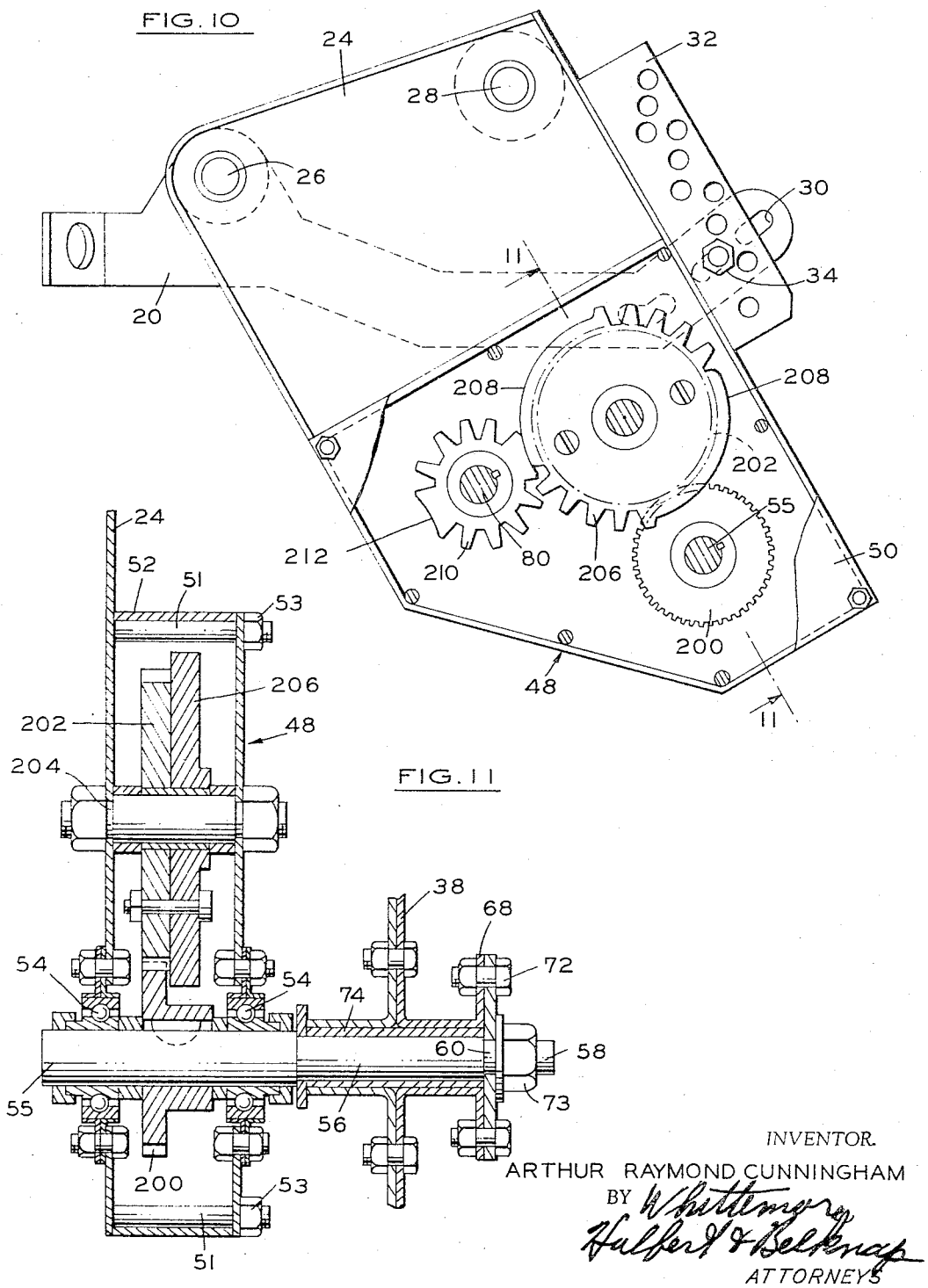

United States Patent Office 3,364,667
Patented Jan. 23, 1968

3,364,667
HAY TEDDER
Arthur Raymond Cunningham, Okahumpka, Fla.; Thomas Wayne Cunningham and The First National Bank of Leesburg, executors of said Arthur R. Cunningham, deceased, assignors to Cunningham & Sons, Okahumpka, Fla., a partnership
Filed Dec. 4, 1964, Ser. No. 416,077
11 Claims. (Cl. 56—372)

ABSTRACT OF THE DISCLOSURE

The hay tedder comprises a tedder assembly having a shaft disposed transversely of the central longitudinal axis of the draft frame, with a plurality of tines distributed along the length of the shaft. Drive means are provided for rotating the tines about the axis of the shaft in an upward and rearward arc during movement of the apparatus in a forward direction. During the time the tines extend downwardly in the crop pick-up phase, the drive means rotates the tines slowly or not at all to allow the crop to accumulate. Thereafter, the drive means rotates the tines relatively rapidly in an upward and rearward arc to release the crop material.

The drive means may comprise the gearing including elliptical gears as shown in FIGURES 3 and 12, and may also comprise the special gearing shown in FIGURE 10.

---

This invention relates to tedding apparatus and refers more particularly to a machine for turning and fluffing a cut crop lying on the ground in order to promote curing and drying.

One of the essential objects of the invention is to provide improved tedding apparatus having a longitudinally movable draft frame and a tedder assembly mounted on the frame and provided with a plurality of rotatable tines adapted to pick up and fluff the crop.

Another object is to provide a tedder having means for effecting a variable rotation of the tines such that they move alternately relatively fast and relatively slow. Preferably the tines move slowly as they pick up the crop and then move rapidly to discharge the crop.

Another object is to provide a tedder in which the tines are moved through their arcs intermittently so that while they are picking up the crop they are actually not moving in rotation.

Another object is to provide a novel drive for the tines composed of elliptical gears.

Another object is to provide a novel drive for the tines composed of intermittent gearing.

Another object is to provide a novel tine construction in which the tines are actually integral portions of wire spring elements which extend tranversely across the shaft, the mid-portions of the elements being secured to the shaft and the portions extending to either side thereof from the mid-portion constituting the tines.

Another object is to provide a novel releasable connection for securing the wire spring elements to the shaft.

Other objects and features of the invention will become apparent as the description proceeds, especially when taken in conjunction with the accompanying drawings, wherein:

FIGURE 5 is a fragmentary transverse sectional view through the tedder assembly showing one of the spring wire elements secured to the shaft and also illustrating a stripper element which is disposed between the spring wire elements.

FIGURE 6 is an enlarged sectional view taken on the line 6—6 in FIGURE 5.

FIGURE 7 is a detail view of the bracket employed for releasably securing each spring wire element on the tedder shaft.

FIGURE 8 is a diagram illustrating the rotation of the tines during forward travel of the apparatus.

FIGURE 9 is a fragmentary view illustrating a modification of the structure shown in FIGURE 5.

FIGURE 10 is similar to FIGURE 3 but shows a further modification.

FIGURE 11 is a sectional view taken on the line 11—11 of FIGURE 10.

Figure 1:
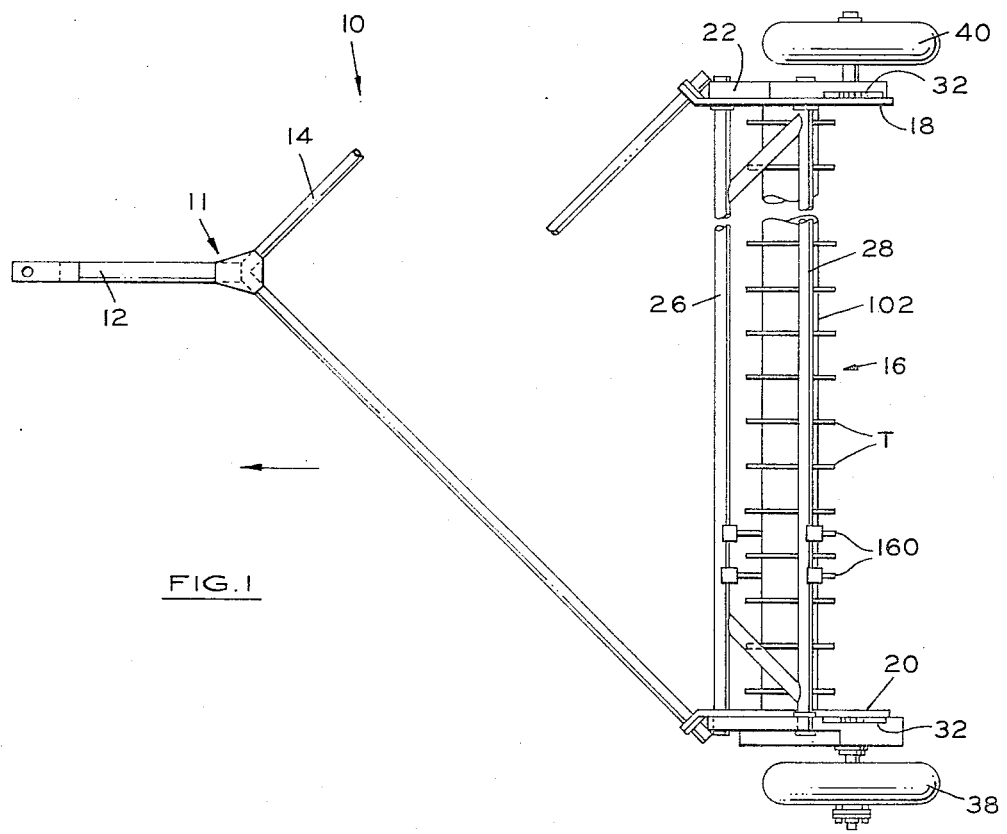
FIGURE 1 is a fragmentary plan view with parts broken away of tedding apparatus embodying my invention.

Referring now more particularly to the drawings, and especially to FIGURES 1-8, the tedding apparatus is generally indicated at 10 and comprises the longitudinally movable draft frame 11. The draft frame includes a longitudinally extending tongue 12 which is adapted to be connected to a vehicle for drawing the tedding apparatus across a field in a forward direction, that is from right to left in FIGURE 1. The draft frame also includes the outwardly and rearwardly extending bars 14 which are secured to the rear end of the tongue. The draft frame also includes the generally rearwardly extending arms 18 and 20 which are rigidly connected to the rear ends of the frame bars 14.

The tedder assembly 16 includes the parallel end plates 22 and 24. These end plates are connected together by the horizontal shafts 26 and 28 which extend at right angles to the longitudinal center line of the frame. Shaft 26 is pivoted at its ends to the arms 18 and 20 so that the tedder assembly can pivot about the axis of shaft 26 to adjust the elevation of the tedder assembly. As noted in FIGURES 2 and 3, the rear ends of the arms 18 and 20 have slots 30, and the end plates 22 and 24 have apertured members 32. After the tedder assembly has been adjusted in elevation, a nut and bolt assembly 34 can be inserted through one of the apertures in each member 32 and through the aligned slot 30 in the associated arms 18, 20 in order to fix the adjustment.

The tedder assembly has a horizontal shaft 42 which extends at right angles to the longitudinal center line of the draft frame. The ends of the shaft are supported in bearings for rotation in the end plates or members 22 and 24. Ground wheels 38 and 40 are carried by the end plates 22 and 24 to rotatably support the tedder assembly during movement of the apparatus along the ground.

Figure 4:
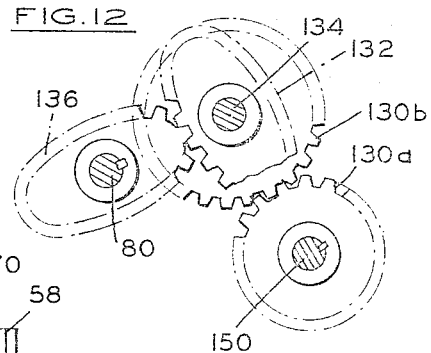
FIGURE 4 is a sectional view taken along the line 4—4 of FIGURE 3.

FIGURE 4 illustrates the mounting of one of the ground wheels 38 on the tedder assembly. The end plate 24 has a housing 48 on the outboard side which includes the plates 50 and 52. Plate 52 welded to end plate 24 and the cover plate 50 is secured to posts 51 by nuts 52. The housing 48 encloses the drive from the ground wheel 38 to the tine shaft as will appear more fully hereafter.

The end plate 24 and cover plate 50 of the housing have bearings 54 which rotatably support wheel spindle 55. Spindle 55 has an external reduced portion 56, and a small diameter end portion 58 which includes a square or non-circular part 60. The ground wheel 38 comprises the side flanges 62 which have tubular portions 64 and 66 rotatably mounted on the reduced portion 56 of the spindle. The tubular portion 66 also has a radial flange 63 which is normally secured to the disc 70 by the nut and bolt assemblies 72. The disc 70 has a square hole nonrotatably fitting the square part 60 of spindle 55 so that the ground wheel will rotate the spindle as it turns. The disc is retained on the spindle by a nut 73 threaded on end portion 58. When desired, the drive from the wheel 38 to spindle 55 can be disconnected by removing the fasteners 72 in which event the wheel will simply rotate on the spindle. A bushing 74 surrounding the reduced portion 56 of the spindle lets the wheel turn freely.

A simple spindle for the opposite ground wheel 40 is provided to permit it to rotate freely.

The tine shaft 42 is a tubular member having spindles welded to the ends thereof designated 80. The spindles are suitably mounted for free rotation in the end plates 22 and 24. Distributed in equally spaced relation along the length of the shaft 42 are a plurality of spring wire elements 82 which may be of circular cross-section. The elements 82 may be formed of metal or any suitable resilient spring-like material. The mid-portions 84 of the elements are semi-circular and fit snugly around one-half of the shaft 42, as seen in FIGURE 5. Each spring wire element is of the same configuration. The remaining portions of such elements project in opposite directions from the mid-portion and comprise the tines of the apparatus. These tines are designated T, and are merely the integral portions of a single spring wire element 82. If desired these spring wire elements may have loops 86 to increase the resilient character of the tines, but this is not necessary and the loops may be omitted as shown in the modification of FIGURE 9.

In order to releasably secure the springs elements on the shaft, brackets 90 are provided. FIGURE 7 shows one of the brackets laid out flat. One bracket is provided for each tine and in use is generally in the form of a U as shown in FIGURE 5. The legs of the U are formed to provide hooks 92 which engage the spring wire element on the two sides of the mid-portion 84. A nut 92 is welded or otherwise secured within the return-bent part of the bracket, and a screw such as an Allen screw 94 extends through a hole in the bracket and threads into the nut and bears against the shaft 42 to cause the bracket 90 to hold the spring wire element firmly on the shaft. The spring wire element can be easily removed by loosening the screw 94 and removing bracket 90.

Figure 2:
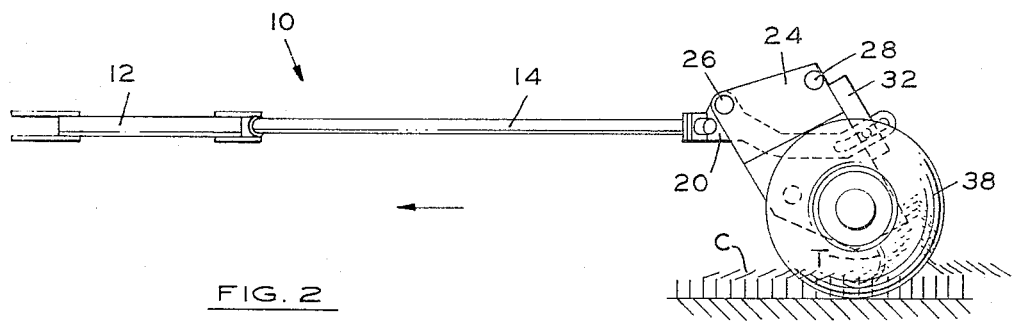
FIGURE 2 is a side elevation of the tedding apparatus shown in FIGURE 1.

In the operation of the machine, the shaft 42 is rotated counterclockwise in FIGURES 2 and 5 during forward movement of the apparatus to the left so that the tines swing in an upward and rearward arc. The tines, in other words, rotate in the same direction as the ground wheels. The tines have shank portions 98 extending radially outward from shaft 42 and terminate in the curved or arcuate terminal portions A and O. These terminal portions extend opposite to the direction of rotation and sweep close to the ground to pick up the cut crop and fluff it and turn it over to facilitate drying. As seen in FIG. 2, the tines sweep through the crop lying on its own stubble, and the crop, which may be hay for example, is shown at C.

The shaft 42 is protected by a concentric surrounding sleeve 102. Sleeve 102 is made up of half segments 104 and 106 which are secured together by screws 108. Screws 110 secure the sleeve to wooden spacers 112 which are in the form of circular discs mounted on shaft 42. The overlapping ends of the half sections of the sleeve are slotted and the slots cooperate with one another to provide openings 114 through which the tines extend. These slots are in axial alignment and the tines are therefore aligned with one another so that all of the tines assume the same angle. The sleeve 102 protects the shaft from having crop material wrap around it during operation. The end plate 24 has a ring 120 secured to it in concentric relation to shaft 42 and the ring extends into the end of sleeve 102 to prevent the crop from entering the sleeve from the end. Preferably, a similar ring is provided on the other end plate 22 so as to extend into the opposite end of sleeve 102 for the same purpose.

Figure 3:
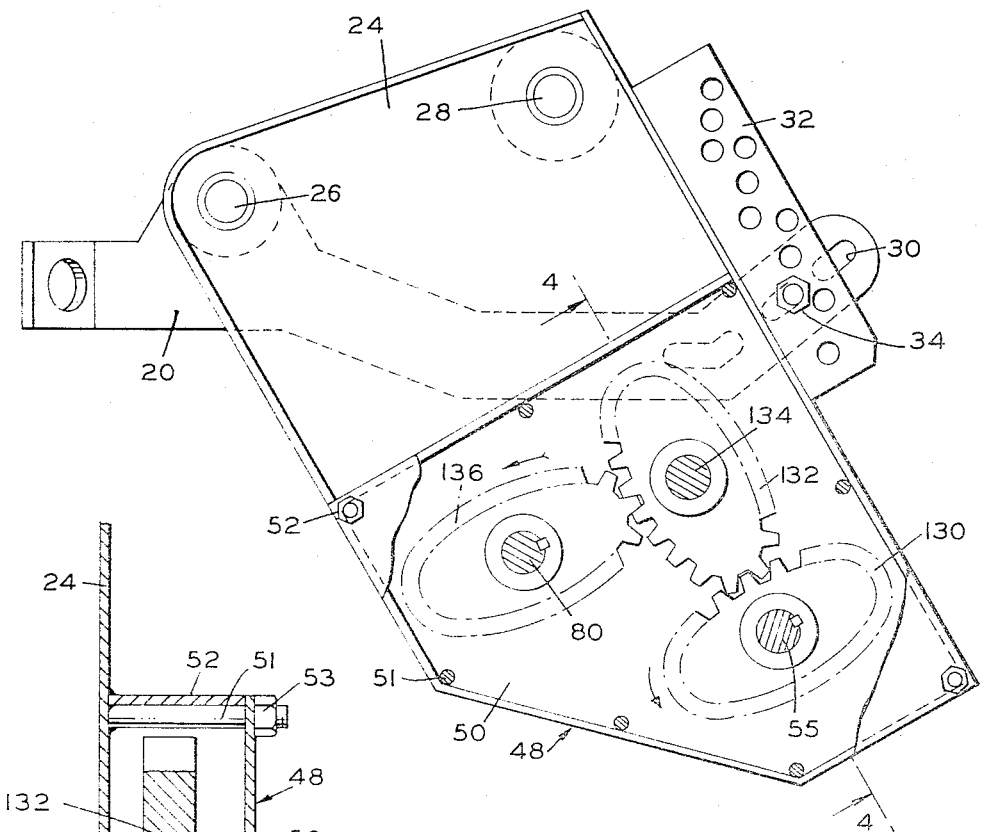
FIGURE 3 is an enlarged fragmentary view, with parts broken away, of a portion of FIGURE 2 showing the drive for the tine shaft.

The drive from the ground wheel to shaft 42 is shown in FIGURES 3 and 4. As already noted, wheel 38 will rotate spindle 55 when fasteners 72 are applied. An elliptical gear 130 is keyed on spindle 55. This gear meshes with a second elliptical gear 132 mounted on a stub shaft 134 within housing 48. Gear 132 in turn meshes with an elliptical gear 136 keyed on the spindle end 80 of tine shaft 42. Accordingly, the elliptical gearing between the ground wheel 38 and the tine shaft 42 will produce an alternately fast and slow rotation of the tine shaft as the ground wheel turns at a uniform speed. With the gears in the position shown in FIGURE 3, the tine shaft will turn relatively slowly, and after the ground wheel has turned 90° it will, through the gearing, cause the tine shaft to rotate relatively fast. As a result, in each half revolution of the ground wheel the tine shaft goes through a complete fast phase and a complete slow phase of its cycle.

FIGURE 8 is a diagram illustrating the operation of the tines. During the slow phase, the tines move from the No. 1 position to the No. 2 position. In the middle of this slow phase the tines are turning at their slowest speed, and this point in the chart is indicated by the line S. The tines in the slow phase gradually decelerate as they approach the line S, and gradually accelerate as they move away from such line. The line S represents the speed when the gearing is in the position shown in FIGURE 3. During the rotation of the tines through the slow phase from the No. 1 position to the No. 2 position, the tines rotate at the most, approximately 75° and preferably less. It is preferred that the rotation be approximately 45° although, as stated, as much as 75° is permissible. It will be understood that all of the tines are in phase with one another so that when one tine is in the No. 1 position all of the other tines are likewise in the No. 1 position. At the beginning of the slow phase, or in the No. 1 position, the tines are moving bodily to the left due to the forward travel of the apparatus, and the terminal portions A and O extend opposite to the direction of rotation. The terminal portion A, in the No. 1 position, projects substantially horizontally into the layer of the cut crop on the ground so that the layer will move into the curved portion of the tine. The tine will rotate only slowly to the No. 2 position and the crop material will not fall off the terminal portion A but will be elevated and partially turned. Then during the remainder of the half revolution of the ground wheel, that is in the fast phase from position No. 2 to position No. 3, the tines will turn faster and they will complete a half revolution so that the opposite terminal portion O is now extending down into the crop material. The line F represents the fastest point in the cycle at which time the gearing in FIGURE 3 is rotated 90°. The tines of course gradually accelerate as they approach line F and gradually decelerate as they move away from line F. During the fast portion of the cycle the crop material, elevated by terminal portion A, is thrown off and returned to the ground in a fluffed and agitated condition for better drying. The action on the cut crop C can be seen in FIG. 2. The second half revolution of the ground wheel will cause the tine shaft to move through another identical slow-fast cycle whereby the terminal portion O will operate on the crop in the same manner as terminal portion A.

It is sometimes desirable to provide strippers between each pair of tines along the shaft. The strippers are designated 160 and are in the form of elongated spring wire elements. Only two strippers are shown for illustrative purposes in FIGURE 1, but it will be appreciated that in actual practice if any are used at all, they will be provided between all of the tines. One end of each stripper is secured to shaft 26 and the opposite end to shaft 28 of the tedder assembly. These ends of the strippers have curved portions 162 which fit around the shafts 26 and 28 and are secured thereto releasably by brackets 90 similar to those which secure the tines to shaft 42. The strippers 162 have the form shown in FIGURE 5 and loop under the sleeves 102 and serve to strip away any crop material which may tend to rotate with the tines and wrap around sleeve 102. The machine will operate without the strippers and often they are omitted.

The elevation of the tines with respect to the ground is initially set by adjusting the nut and bolt assemblies 34 in the proper apertures of members 32 and through the proper slots 30 in the arms 18, 20 of the draft frame. In moving the apparatus over a road or across a field where no tedding action is desired, the tedder assembly 16 may be raised to clear the ground, and the fasteners 72 may be removed so that the ground wheel 38 does not turn the tedder shaft 42.

FIGURE 9 illustrates a modification in which the shaft 42' is square and the mid-portion of the spring wire elements 82' is of the same angular shape as the shaft so as to fit one side of the shaft. The tines 82' will be positively held from rotation because of the cross-section of the shaft and of the spring wire elements. The spring wire elements are otherwise exactly like the spring wire elements shown in FIGURE 5, except that the shanks do not have the loops 86. Otherwise the structure shown in FIGURE 9 is like that already described in FIGURES 1–8. It will be understood that all of the tines in a machine as modified according to FIGURE 9 will have the same configuration as the tine 82'.

While FIGURE 8 illustrates the spring wire elements as lacking the loops 86, it should be understood that FIGURE 8 is only a diagram and is representative of both the tine configuration in FIGURE 5 having loops 86 and the configuration in FIGURE 9 omitting the loops.

FIGURES 10 and 11 show a modification of the drive from the ground wheel 38 to the tine shaft 42. Parts in FIGURES 10 and 11 corresponding to the same parts in FIGURES 3 and 4 bear the same reference numerals. According to the construction in FIGURES 10 and 11, a gear 200 is keyed on the ground wheel spindle 55 and meshes with a gear 202 which rotates on spindle 204 in the housing 48. The gear 202 is fastened to a gear 206 so that the two are constrained to rotate as a unit. Gear 206 has two toothed sectors on diametrically opposite sides separated by the smooth convex arcuate sectors 208. Gear 208 meshes with a gear 210 keyed to the spindle 80 on the end of tine shaft 42. The gear 210 has two toothed sectors diametrically opposed to one another separated by the concave arcuate smooth sectors 212.

The continuous rotation of the ground wheel 38 is transmitted to the gears 202 and 206 so that the gear 206 rotates uniformly when the ground wheel is turning uniformly. When a toothed sector of the gear 206 engages a toothed sector of the gear 210, the tine shaft is rotated. Then when the smooth convex surface 208 of gear 206 engages the concave surface 212 of gear 210, the tine shaft 42 is held from rotating. It will be apparent that upon a half revolution of the gear 206, the tine shaft will be held from rotation for a moment and then will be rotated through 180°. Then through the remaining half revolution of the gear 206 the tine shaft will again be held stationary momentarily, followed by a further rotation of 180°.

Referring to the diagram of FIGURE 8, when the arcuate surface 208 of gear 206 initially engages the concave surface 212 of gear 210, the tines will be in the No. 1 position. In this position the lower terminal A of the tines will sweep under the crop to cause the crop to enter into the curved portion of the tines. The tines will retain this position without movement for a brief period during the forward travel of the apparatus. Then when the gearing on the gear 206 engages the teeth on the gear 210, the tines will be rapidly turned through 180° until the diametrically opposite smooth surface 208 engages the opposite concave surface 212 on gear 210. The tines will then be in the No. 3 position of FIGURE 8, having been reversed end-for-end.

This embodiment of the invention differs from that first described in that the tines do not rotate as they pick up but remain stationary, whereas in the first described construction during the pick up of the crop the tines rotated slowly from position No. 1 to position No. 2. In the embodiment shown in FIGURES 10 and 11, the forward travel of the apparatus causes the crop material, while the tines are stationary, to enter the curved portions of the tines and to be elevated and partially turned by the configuration of the tines. Then when the tines turn rapidly 180° the crop material is flipped and fluffed and returned to the ground.

The arrangement is such that approximately one revolution of the ground wheel 38 effects approximately one revolution of the tine shaft 42 in the construction of tines in FIGURES 10 and 11.

Figure 12:
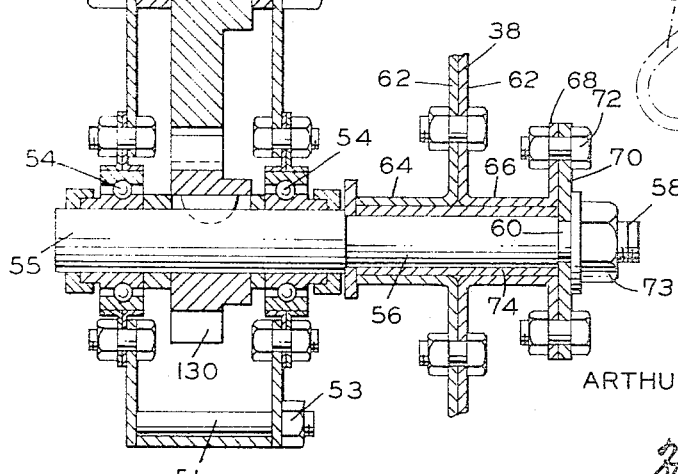
FIGURE 12 is a fragmentary view illustrating a modification of the drive in FIGURE 3.

FIGURE 12 illustrates a modification of the drive shown in FIGURE 3. In FIGURE 3, one revolution of the ground wheel 38 will produce one revolution of the tine shaft 42. The arrangement in FIGURE 12 makes it possible to vary this relationship so that one revolution of the ground wheel 38 may produce more than one revolution of the tine shaft 42, or less than one revolution of the tine shaft, as desired. The spindle 55 on which the ground wheel 38 is mounted has a circular gear 130a keyed on it which meshes with a circular gear 130b keyed on the stub shaft 134. The elliptical gear 132 is also keyed on shaft 134 and meshes with the elliptical gear 136 keyed on spindle 80 of the tine shaft 42. Elliptical gears 132 and 136 are the same as in the FIGURE 3 construction. It will be obvious that by changing the size of the gears 130a and 130b the amount of rotation transmitted to the tine shaft from the ground wheel can be varied. For example, gear 130a can be increased in size and gear 130b made smaller to increase the number of turns of the tine shaft per ground wheel revolution. Likewise, the gear 130b may be increased in diameter and gear 130a decreased to produce the reverse effect.

What I claim as my invention is:

1. Tedding apparatus comprising a longitudinally movable draft frame, a tedder assembly mounted on said frame, ground-engaging wheels for said tedder assembly, said tedder assembly having a shaft disposed in fixed position a predetermined distance above ground transversely of the central longitudinal axis of said frame and having a plurality of tines secured to and distributed along the length of said shaft, continuously operative gear drive means operatively connected to said shaft for rotating said tines about the axis of said shaft in the direction of rotation of said ground-engaging wheels during forward movement of the apparatus so that in each full revolution said tines move through a crop pick-up phase followed by a crop release phase, each tine having a shank projecting outwardly from said shaft and a terminal portion extending from the outer end of said shank in a direction of rotation of said tines, said terminal portions of said tines being disposed adjacent to the ground to pick up the crop in said crop pick-up phase, said drive means being operative to positively restrain the rotation of said tines during each crop pick-up phase and to rotate said tines relatively rapidly with a positive, controlled action during each crop release phase.

2. The tedding apparatus defined in claim 1, wherein said drive means operates to turn said tines relatively slowly during each crop pick-up phase.

3. The tedding apparatus defined in claim 2, wherein said drive means includes generally elliptical gearing.

4. The tedding apparatus defined in claim 2, wherein said tines move through an arc of approximately 75° or less in each pick-up phase.

5. The tedding apparatus defined in claim 2, wherein said tines move through an arc of approximately 45° in each crop pick-up phase.

6. The tedding apparatus defined in claim 5, wherein said drive means includes generally elliptical gearing operatively connected to one of said ground-engaging wheels.

7. The tedding apparatus defined in claim 1, wherein said drive means operates to stop the rotation of said tines during each crop pick-up phase.

8. The tedding apparatus defined in claim 7, wherein said drive means includes gears having meshing teeth over portions of their peripheries and having mating smooth surfaces over other portions of their peripheries, one of said smooth surfaces being concave and the mating smooth surface being convex.

9. The tedding apparatus defined in claim 1, wherein said tines are aligned longitudinally of said shaft, a plurality of additional tines of substantially identical construction to said first-mentioned tines, said additional tines being secured to and distributed along the length of said shaft, each additional tine being in substantially the same plane as one of said first-mentioned tines having a shank projecting outwardly from said shaft in a direction diametrically opposite the shank of said one of said first-mentioned tines and having a terminal portion extending from the outer end of the shank thereof in a direction opposite to the direction of rotation of said tines, the rotation of said additional tines by said gear drive means being such that in each full revolution said additional tines move through a crop pick-up phase followed by a crop release phase, said terminal portions of said additional tines being disposed adjacent to the ground to pick up the crop in the crop pick-up phase of said additional tines, said drive means being operative to positively restrain the rotation of said additional tines during each crop pick-up phase thereof and to rotate said additional tines relatively rapidly with a positive, controlled action during each crop release phase thereof.

10. The tedding apparatus defined in claim 9, wherein each additional tine is formed integrally with one of the first-mentioned tines from the same piece of resilient wire material.

11. The tedding apparatus defined in claim 1, including means for mounting said tedder assembly on said frame in adjusted position to adjust the height of said shaft above the ground.

References Cited

UNITED STATES PATENTS

| | | | |
|---|---|---|---|
| 123,710 | 2/1872 | Lee | 56—367 |
| 855,686 | 6/1907 | Bacon | 56—381 |
| 2,143,236 | 1/1939 | Birk | 74—437 |
| 2,514,560 | 7/1950 | Scranton | 56—400 |
| 2,583,655 | 1/1952 | Larsen | 56—387 |
| 3,141,284 | 7/1964 | Reynolds | 56—372 |

FOREIGN PATENTS

| | | |
|---|---|---|
| 118,319 | 3/1947 | Sweden. |
| 134,161 | 1/1952 | Sweden. |

ABRAHAM G. STONE, *Primary Examiner.*

ANTONIO F. GUIDA, *Examiner.*

P. A. RAZZANO, *Assistant Examiner.*

UNITED STATES PATENT OFFICE
CERTIFICATE OF CORRECTION

Patent No. 3,364,667                                              January 23, 1968

Arthur Raymond Cunningham

It is hereby certified that error appears in the above numbered patent requiring correction and that the said Letters Patent should read as corrected below.

Column 6, line 57, after "direction" insert -- opposite to the direction --.

Signed and sealed this 18th day of March 1969.

(SEAL)
Attest:

Edward M. Fletcher, Jr.                                          EDWARD J. BRENNER Attesting Officer                                                   Commissioner of Patents